Nov. 12, 1929.        T. COTTER ET AL        1,735,038
BATTERY TERMINAL
Filed Feb. 18, 1927

Inventors
Thomas Cotter and
Thomas Francis Griggs
By [signature] their Atty.

Patented Nov. 12, 1929

1,735,038

UNITED STATES PATENT OFFICE

THOMAS COTTER AND THOMAS FRANCIS GRIGGS, OF EVANSVILLE, INDIANA

BATTERY TERMINAL

Application filed February 18, 1927. Serial No. 169,375.

This invention relates to terminals for attachment to the posts of storage batteries such as are used on automobiles for ignition, lighting, and starting purposes.

The form of terminal or connector which is commonly employed at the present day embodies a split ring provided with a clamping bolt. After the old style connector has been clamped on the post for some time, if there has been creepage of the battery fluid, unless the battery posts are well greased, corrosion results and great difficulty is encountered in disconnecting the terminal from the battery post if the battery has to be removed for recharging or substitution of another battery. In fact, in order to remove the corroded terminals, it is sometimes necessary to hammer or pry them, which results in injury to the battery posts and in breakage of the terminals.

The object of our invention is the provision of an improved quick attachable and detachable battery terminal comprising novel means whereby it may be clamped on the battery post and novel means for securing the terminal to the connector or feed wire; further to provide a battery terminal of rustless metal so that it will not be susceptible to corrosion.

Our improved terminal embodies a clevis adapted to fit over the battery post, a clamp adapted to engage the battery post, and screw means for acting on the clamp to cause it and the clevis to tightly bind against the battery post.

The invention also embodies a novel friction clamp for tightly connecting the conductor to the terminal, permitting easy and positive assembly and maintenance of a tight joint.

The battery terminal is preferably of rustless metal, which prevents corrosion due to creepage of the battery fluid or from other causes.

Figure 1:
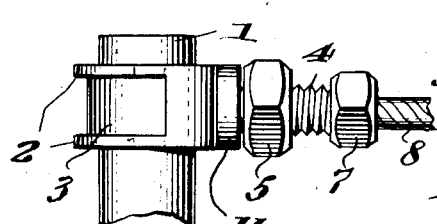
Figure 1, is a side view of the battery terminal attached to the conductor and also attached to the battery post.
Figure 3:
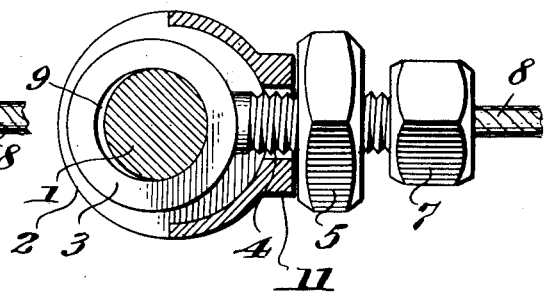
Fig. 3, is a horizontal section of the terminal in position on a battery post.
Figure 2:
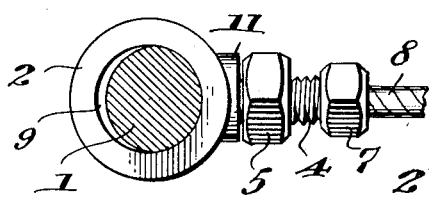
Fig. 2, is a plan view showing the terminal applied to a battery post.
Figure 4:
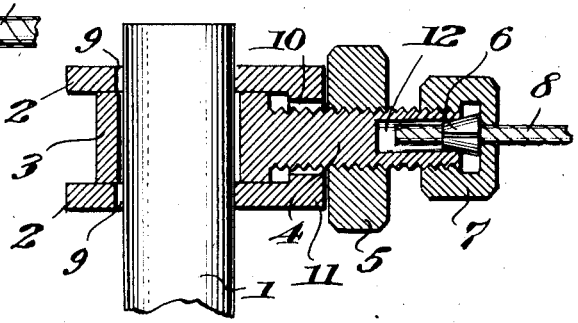
Fig. 4, is a vertical section therethrough.
Figure 5:
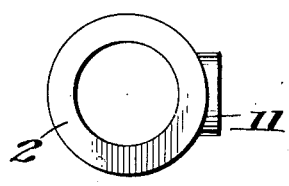
Fig. 5, is a plan view of the clevis.
Figure 6:
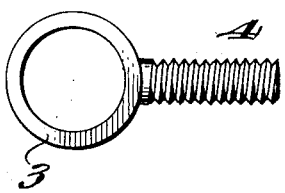
Fig. 6, is a similar view of the clamp.
Figures 7, 8:
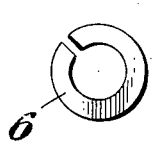
Figs. 7 and 8, are detail views of the tapered split ring for connecting the conductor to the clamp.

One of the posts of the storage battery is shown at 1 to illustrate how our invention is applied thereto.

Our invention comprises but five parts, namely, a clevis 2, a ring-shaped clamp 3 having a screw threaded shank or bolt 4, a clamping nut 5, a split tapered collar 6 and a clamping nut 7. The conductor to which the terminal is connected is shown at 8.

The aforesaid parts are arranged in this fashion: the clevis 2 has openings 9 slightly larger than the battery post 1 and said clevis has an opening 10 through which the shank or stem loosely passes.

The clamp 3 is of ring shape, being of slightly greater size than the battery post 1 and it is arranged within the jaws of the clevis to slide therein.

The clamping nut 5 is provided with internal screw threads engaging the threads on the shank 4 and it is adapted to be screwed up to exert pressure against the part 11 of the clevis 2.

When the nut 5 is screwed up, the battery post 1 is clamped between one side of the ring 3 of the clamp and the opposite side of the open part 9 of the clevis.

The shank 4 is counterbored as at 12 to receive the end of the conductor 8.

Our improved means for connecting the conductor 8 to the shank 4 comprises the tapered split metallic ring 6 and clamping nut 7 which has internal screw threads engaged with the screw threads of the shank 4. The nut 7, when tightened, forces the split ring 6 into the counterbored part 12 and compresses said split ring 6 around the conductor 8 while, at the same time, forcing or wedging said split ring within the end of the stem 4. The joint is a protected one and may be made very tight and yet it can be easily released.

When applying the terminal, after it has been attached to the end of the conductor 8, the nut 5 is loosened sufficiently to provide an opening through the ring 3 of a size to permit the clevis and the ring to slip over the battery post 1. The nut 5 is then tightened and, because it exerts pressure against the part 11, the battery post is tightly gripped by the clamp and by the clevis.

The terminal is easily released by unscrewing the nut 5.

A check nut may be provided on the stem 4 to prevent the nut 5 from backing off, due to the vibration to which an automobile is subject but such check nut is not essential and, for the reason, is not shown.

The parts are preferably made of rustless metal, preferably of rustless steel and hence they cannot corrode.

What we claim is:

1. A battery terminal comprising a clevis having a solid back and provided with ring-shaped jaws which receive the battery post, said clevis having an opening extending through its solid back, a ring-shaped clamp adapted to receive the battery post and slidable between the jaws of the clevis, said clamp having a screw-threaded shank slidable through the solid back of the clevis, a clamping nut carried by said screw-threaded shank and adapted to bear on the solid back of the clevis when the nut is tightened, thereby to cause the clevis and clamp to grip the battery post, said shank having a cavity in its end adapted to receive the end of an electric conductor, a split, tapered ring received within said cavity and adapted to surround the conductor end, and a nut carried by the screw-threaded shank and adapted to force the split, tapered ring within the cavity.

2. A battery terminal comprising a clevis having a solid back and provided with ring-shaped jaws adapted to receive the battery post, said clevis having an opening extending through its solid back, a clamp adapted to engage the battery post and provided with a screw threaded stem or shank which extends through the aforesaid opening, a nut carried by said shank which is adapted to bear on the solid back of the clevis and to cause the clevis and the clamp to grip the battery post, and means for connecting an electric conductor to the free end of the screw threaded shank beyond the aforesaid nut.

In testimony whereof we affix our signatures.

THOMAS COTTER.
THOMAS FRANCIS GRIGGS.